US011054842B2

(12) United States Patent
Oberndorfer et al.

(10) Patent No.: US 11,054,842 B2
(45) Date of Patent: Jul. 6, 2021

(54) DRONES AND METHODS FOR REDUCING DOWNWASH OF DRONES

(71) Applicant: Intel Corporation, Santa Clara, CA (US)

(72) Inventors: Fabian Oberndorfer, Krailling (DE); Wolfgang Rottner, Krailling (DE); Stefan Klar, Planegg (DE)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 16/352,982

(22) Filed: Mar. 14, 2019

(65) Prior Publication Data
US 2019/0212755 A1   Jul. 11, 2019

(51) Int. Cl.
*G05D 1/08* (2006.01)
*B64C 39/02* (2006.01)
*B64C 7/00* (2006.01)

(52) U.S. Cl.
CPC ............. *G05D 1/0816* (2013.01); *B64C 7/00* (2013.01); *B64C 39/024* (2013.01); *B64C 2201/027* (2013.01); *B64C 2201/108* (2013.01); *B64C 2201/165* (2013.01)

(58) Field of Classification Search
None
See application file for complete search history.

(56) References Cited

U.S. PATENT DOCUMENTS

| 2016/0159471 A1* | 6/2016 | Chan | B64C 27/08 244/39 |
|---|---|---|---|
| 2017/0247113 A1* | 8/2017 | Sanlaville | B64C 27/08 |
| 2019/0077498 A1* | 3/2019 | Yu | B64D 31/06 |
| 2020/0031458 A1* | 1/2020 | Strauss | B64C 27/001 |

OTHER PUBLICATIONS

Honig et al., "Trajectory Planning for Quadrotor Swarms", IEEE Transactions on Robotics, vol. 34, No. 4, Aug. 2018, p. 856-869 (Year: 2018).*
Stepniewski, "Rotary-Wing Aerodynamics", 2017, Dover Publications, p. 122-125 (Year: 2017).*

* cited by examiner

*Primary Examiner* — Tamara L Weber
(74) *Attorney, Agent, or Firm* — Viering, Jentschura & Partner MBB (57) ABSTRACT

Methods and devices are presented for controlling or reducing amount of downwash generated by a drone. A drone including a plurality of arms including rotors may be configured to operate and fly with arms in an elevated position with respect to a horizontal plane. The elevated arms may allow a drone to fly with reduced vertical downwash.

14 Claims, 7 Drawing Sheets

Iteration - 260

Speed [m/s]

DRONES AND METHODS FOR REDUCING DOWNWASH OF DRONES

TECHNICAL FIELD

Various embodiments generally relate to the operation of unmanned aerial vehicles.

BACKGROUND

Unmanned aerial vehicles (UAVs), e.g., drones such as multi-rotor helicopters, may fly too close to each other and can affect each other adversely because each drone can create a downward flowing stream. This stream of air pushing the drone below can create undesirable turbulence. Thus, to get a stable flight, it may be necessary to increase the distance between the drones.

BRIEF DESCRIPTION OF THE DRAWINGS

In the drawings, like reference characters generally, refer to the same parts throughout the different views. The drawings are not necessarily to scale; emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on," e.g., in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Figure 1:
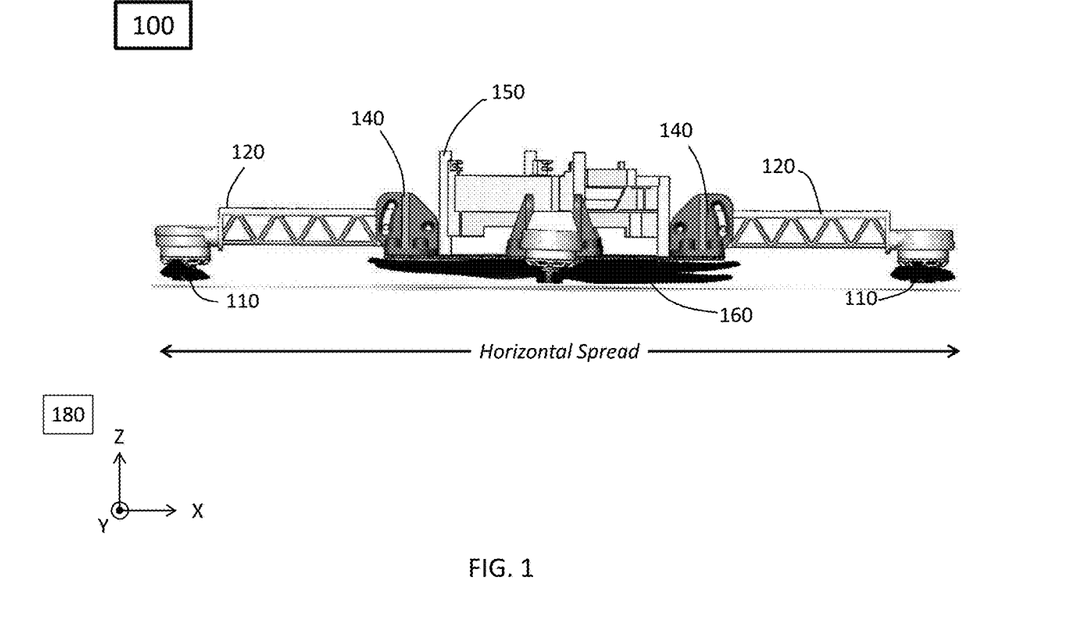
FIG. 1 shows an exemplary drone according to at least one exemplary embodiment of the present disclosure.

FIG. 1 shows an example of a helicopter drone 100. As shown the drone 100 includes rotors 110 coupled to a drone body 150 through drone arms 120. The rotors 110, e.g., the blades or horizontal propellers are located at or are adjacent to the distal end of the drone arms 120. Other similar exemplary drones may also include rotors positioned closer to the drone body. In some instances, the drone arms 120 may be coupled or joined to the drone body 150 by or using a coupling means 140.

The drone arms 120 of drone 100, like other conventional drones, may be fixed so as to be horizontal or substantially horizontal. The coordinate system 180 is aligned to the drone 100 (the Y-axis going into the page). As such, the drone arms 120 are shown to be at an inclination angle of zero degrees with respect to a virtual horizontal plane e.g., a virtual plane parallel the horizontal spread (e.g., greatest horizontal length-wise or horizontal extension) of the drone 100 or parallel to the XY plane of the coordinate system 180. For example, the virtual horizontal plane would be perpendicular to the Z-axis of coordinate system 180. Accordingly, with respect to drone 100, the rotor blades may operate or rotate within a horizontal plane or a virtual XY plane.

FIG. 1 further shows the drone body 150 coupled to or including a centrally located rotor 160. This central rotor 160 is optional, and other similar drones may operate without such a rotor or only have rotors coupled to the periphery of a drone body e.g., via drone arms.

Figure 5:
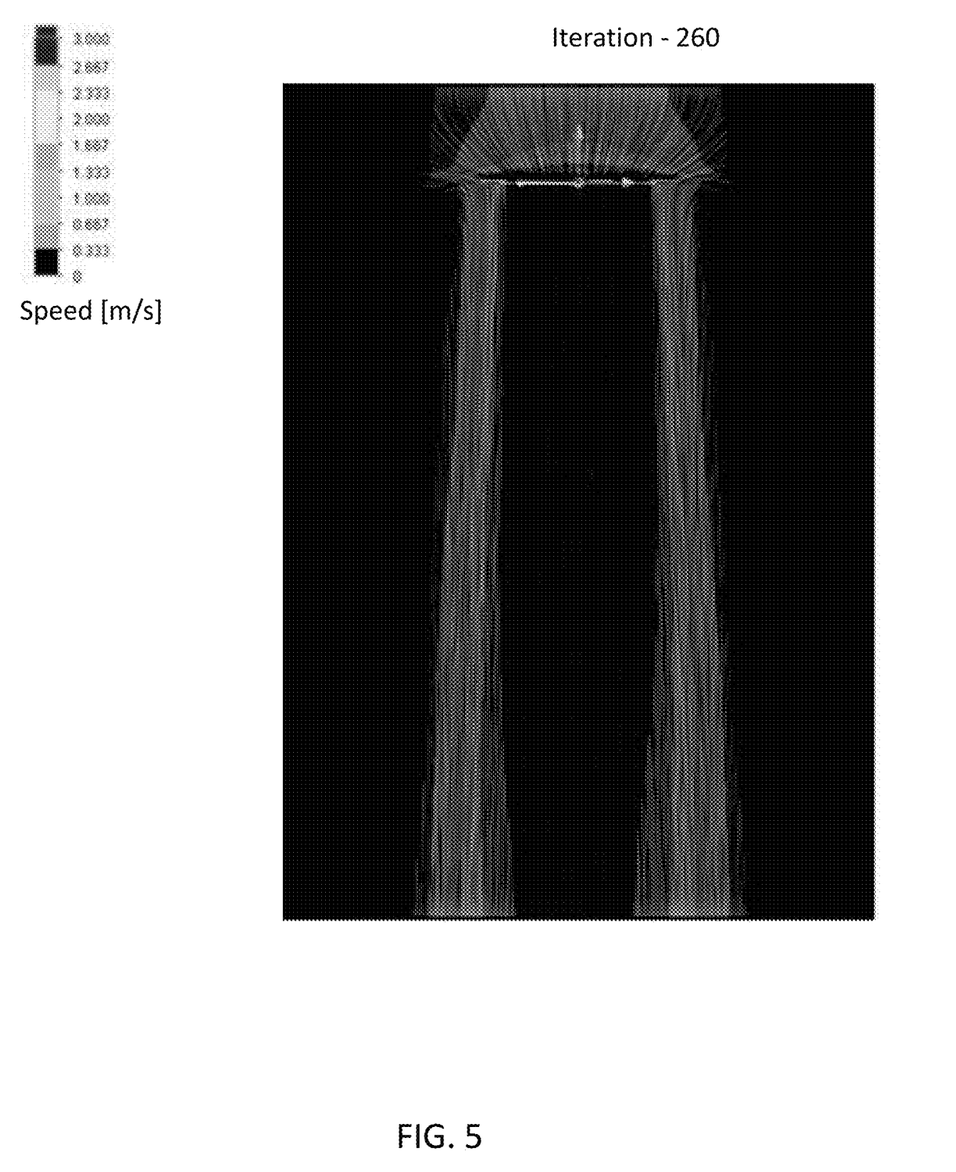
FIGS. 5 and 6 show simulated results of the operation of drones according to at least one exemplary embodiment of the present disclosure.

The drone 100 of FIG. 1 and other similar drones include rotors that provide lift and/or directional flight control. As a result of their operation, the such rotors also create a downwash, which is the change in the direction of air deflected by the aerodynamic action of a rotor blade in motion, as part of the process of producing lift. FIG. 5 shows results of a simulation of the drone 100 in operation (e.g., the rotor blades in operation). The simulation results show the drone 100 producing or generating a concentrated or at least substantially single-stream vertical downwash. In other words, the resulting downwash occurs entirely or almost entirely vertically, in a substantially downward direction with respect to the drone.

In certain circumstances, the concentrated downwash produced by drones such as drone 100 may be too strong and disadvantageous for certain or specific situations. In one example, a plurality of drones may be used for or in a light show. A drone light show may contain up to a 1000 drones flying quite close to each other in a programmed, controlled, or coordinated manner. Since each drone creates a downward looking stream of air e.g., propeller downwash, one or more drones may be subjected to or to a strong enough downwash may at least temporarily become unstable and move in an uncontrolled manner.

Figure 2:
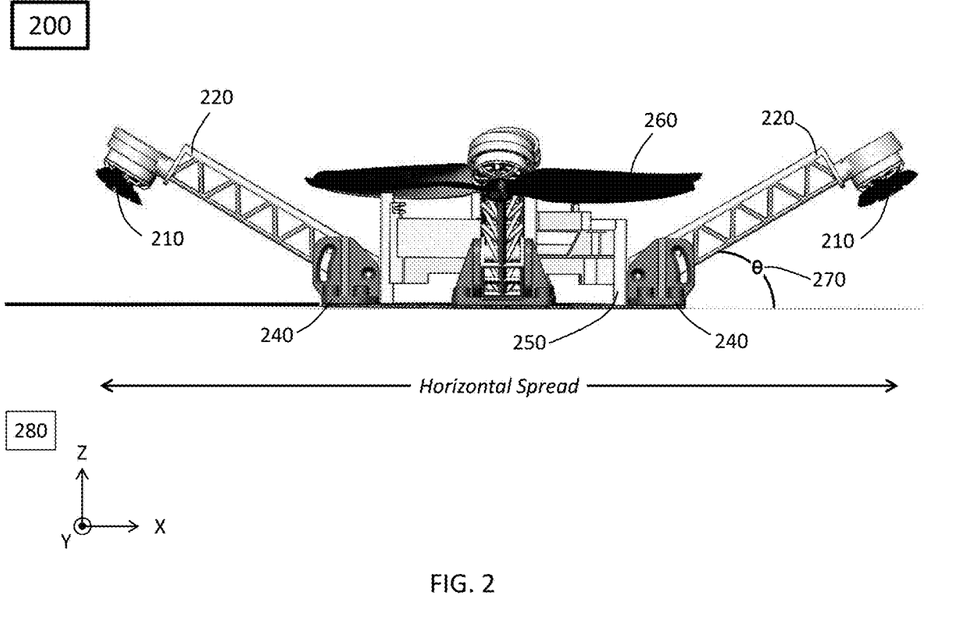
FIG. 2 shows an exemplary drone according to at least one exemplary embodiment of the present disclosure.

FIG. 2 shows an exemplary drone 200 in accordance with exemplary embodiments of the present disclosure. The drone 200, like the drone 100 of FIG. 1, includes rotors 210 coupled to a drone body 250 through drone arms 220. The drone 200 includes a main or central rotor 260. Again, the rotor 260 may be optional and not included in other exemplary drones similar to drone 200.

In FIG. 2, the rotor blades or propellers 210 are also located at or adjacent to the distal end of the drone arms 220. However, this is not necessarily so and in other instances the rotors may be located at positions closer to the drone body. The drone arms 220 are shown in FIG. 2 as having a wire frame structure. This is merely exemplary and in other exemplary embodiments the drone arms may be implemented with any other suitable structure (e.g., solid, integral) using any suitable materials (e.g., plastics, metals, etc.)

The drone arms 220 may be coupled or joined to the drone body 250 by a coupling means 240. Unlike the drone 100 or other similar drones, the drone arms 220 do not extend strictly horizontally from the drone body. Instead, each of the drone arms 220 are inclined from the drone body 250. As a result, the drone arms 220 have a vertical or inclination angle 270 ($\theta$) with respect to a virtual horizontal plane or an XY plane (see coordinate system 280) aligned to the drone 200 or drone body 250. The virtual horizontal plane, as shown in FIG. 2, can be parallel to the (current) horizontal spread of the drone 200.

FIG. 2 shows an example of how the vertical angle 270 is measured, e.g., from a virtual horizontal plane to the bottom side of the drone arm 220. In other exemplary embodiments of the present disclosure, the vertical angle may be measured differently, such as from a virtual horizontal plane to another part of the drone arm, such as, for example, to a middle or midpoint of the arm, to a top side the arm, etc.

In contrast to the rotors 110 of drone 100, the drone rotors 210 are not co-planar. That is, the rotors 210 do not all substantially rotate within a same virtual horizontal plane (e.g., an XY plane). Instead, the rotors 210 are also angled or inclined (e.g., due to the inclination of the drone arms 220). As a result, the drone 200 may create, when the drone is in operation (e.g., when rotors blades are rotating/spinning), substantially less vertical downwash. Said differently, the vertical component of the downwash (e.g., along Z-direction or parallel to XY plane) produced by drone 200 is reduced in comparison to drone 100.

Without being bound by theory, the drone 200 in operation (e.g. flying, taking off, landing, etc.) may create substantially less vertical downwash when the inclination angle 270 is at least 10 degrees. That is, if the inclination angle 270 is less than 10 degrees, the reduction of the vertical component of the downwash is negligible. In one or more examples, the drone arms 220 may have an elevation angle of 20 degrees, 30 degrees, or 45 degrees. The flight ability or flight characteristics of the drone 200 may be altered depending on the vertical or inclination angle 270.

Figure 6:
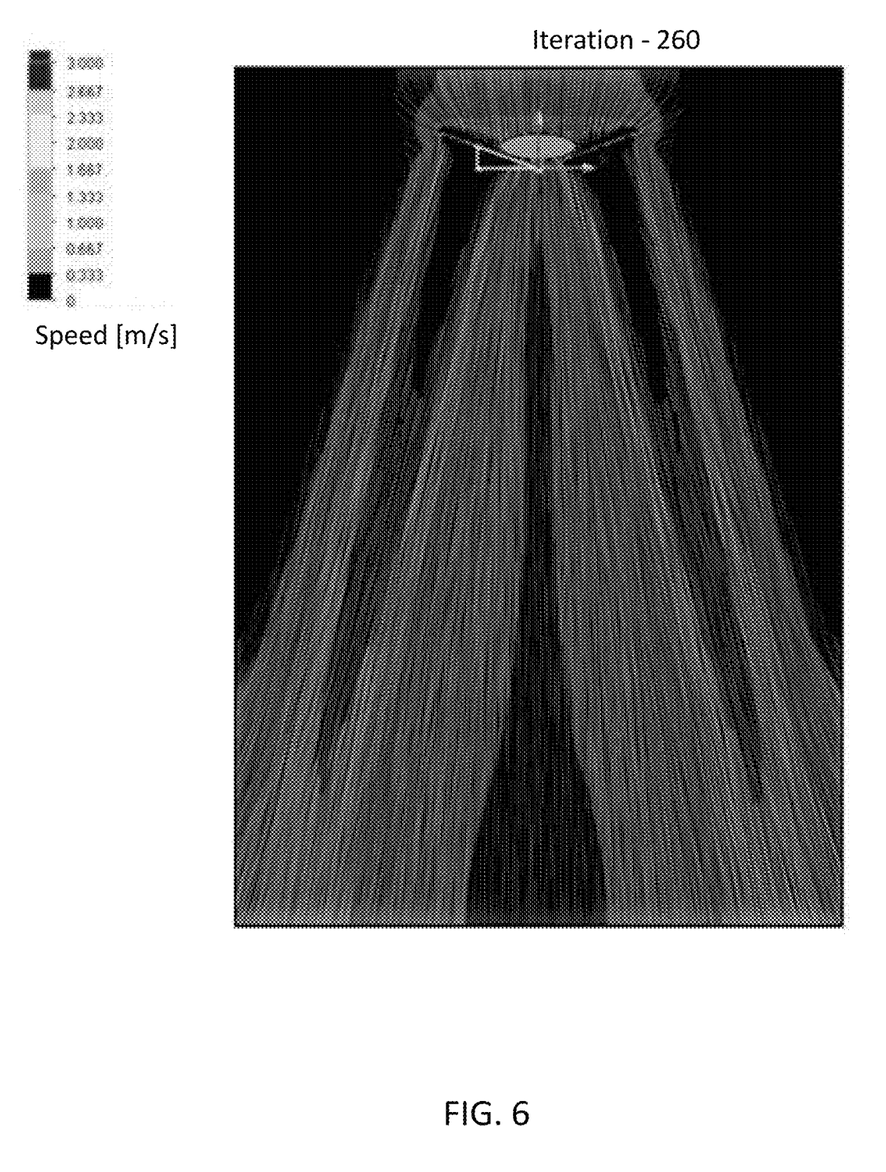

FIG. 6 shows a simulation of the downwash produced by the drone 200 with the drone arms 220 each having a vertical or inclination angle of 20 degrees. As shown in FIG. 6, the downwash is no longer concentrated in a downward vertical direction. Instead, the downwash produced by drone 220 has a vertical component and a horizontal component. As a result, the downwash now is split. This resulting "multi-stream" downwash has reduced vertical downwash component with some downwash horizontally directed. The results show that drones having drone arms with an inclination angle of 20 degrees can reduce the vertical downwash component by 30%.

In one or more exemplary embodiments of the present disclosure, the drone arms 220 may be coupled to the drone body 250 with a permanent or persistent fixed inclination angle 270. In other words, the inclination angle of the drone 200 may not change. In other exemplary embodiments of the present disclosure, the inclination angle 270 may be adjustable. For example, the drone arms 220 may be attached to the drone body 250 with a joining mechanism 240 that allows for repositioning or adjustment of the inclination angle 270. For example, the joining mechanism may allow the drone arms to at least partially rotate so as to allow a change to the vertical angle 270.

In exemplary embodiments of the present disclosure, adjustment of the inclination or vertical angle may be accomplished through manual means, e.g., by a person. That is, a joining mechanism 240 may allow or enable a person to adjust the vertical angle 270, such as by allowing rotation of the drone arms 220. In general, a person may adjust the vertical angle 270 or inclination of the drone 200 when the drone is not in flight.

In accordance with exemplary embodiments of the present disclosure, the vertical angle 270 may be adjustable in a continuum from lower limit (e.g., 0 degrees, 5 degrees, 10 degrees, etc.) to a higher limit (e.g., 20 degrees, 30 degrees, 45, degrees, 60 degrees, etc.) In other exemplary embodiments, the joining mechanism 240 may be configured only to allow the vertical angle 270 to be adjusted to certain positions or certain vertical angles, such for example, 0 degrees, 20 degrees, 30 degrees, 40 degrees, etc. That is, the angles may be limited to angles that allow for drone flight or stable drone flight.

In other exemplary embodiments of the present adjustment, the drone 200 may include means to adjust the inclination or vertical angle 270 of the drone arms 220.

Figure 3:
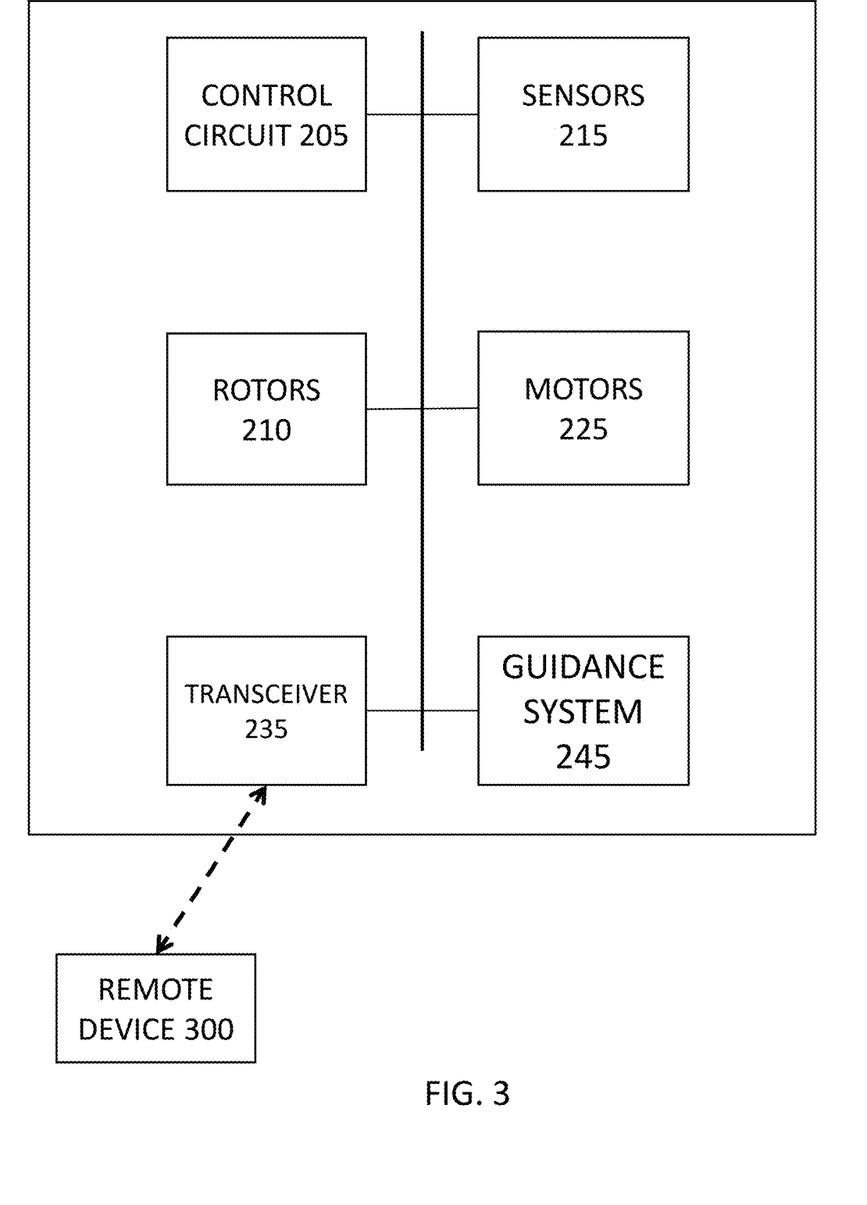
FIG. 3 shows exemplary drone components according to at least one exemplary embodiment of the present disclosure.

FIG. 3 shows according to exemplary embodiments, a simplified diagram depicting further various components that may be included as part of the drone 200. That is, the drone 200 may further include a control circuit 205 which is operably coupled (e.g., through wired or wireless means) to drone sensors 215, the rotors 210, the motor(s) 225, a transceiver(s) 235, and a guidance system 245.

The control circuit may include a computer or one or more processors coupled to a non-transitory computer-readable medium including or storing instructions, that when executed by the or more processors, direct or cause the control circuit to perform certain tasks described herein.

In at least one exemplary embodiment of the present disclosure, the control circuit 205 may interface with motor(s) (e.g., servomotor(s) including a microcontroller). The control circuit 205 may be configured to operably cause the motors to reposition the drone arms 220 (e.g., through rotation) to have a particular inclination or vertical angle 270. The control circuit 205 may cause the drone arms 220 to have a particular inclination angle in response to receiving control signal(s). In other words, the drone may switch from one state to another state, e.g., switching the state of the drone 200 from having drone arms at a first inclination angle to a state where the drone arms 210 at a second different inclination angle. For example, in various embodiments, the switching may include toggling from a mode in which the drone produces substantially vertical downwash (e.g., a substantially single stream downwash) to a mode in which the drone produces reduced vertical downwash (e.g., multi-stream vertical downwash). In another example, the control circuit 205 may cause the drone arms to change inclination so as to reduce vertical downwash by a certain amount or a certain percentage.

In various exemplary embodiments, the control circuit may obtain control signal(s) received by the transceiver 235 that indicate that that the inclination angle 270 of the drone arms 220 should be changed or altered, e.g., the inclination angle 270 of the drone arms 220 should be increased or decreased. In response to obtaining or receiving the control signal(s), the control circuit 205 causes the drone arms 220 (e.g., via the motors 225) to change as indicated in the signal(s).

Further, one or more control signals may indicate a specific inclination or vertical angle for the drone arms 220. Then the control circuit 205 in response to obtaining the control signal(s), may cause the arms 220 to move via the motors 225 to the specified or indicated vertical angle 270.

In accordance with at least one exemplary embodiment of the present disclosure, the transceiver 235 may receive control signals from a remote device 300. The remote device 300 may be any suitable computing device (remote control, computer, smartphone, tablet, etc.) that can wireless transmit signals to the drone transceiver 235. In other embodiments, the transceiver may communicate with or through one or more networks, such as, for example, the Internet.

In one or more exemplary embodiments of the present disclosure, the control circuit 205 may cause the drone arms 220 to change position in response to detection of certain environmental or flight circumstances. As shown in FIG. 3, the drone 200 may include sensors. Based on sensor data obtained from the sensors 215, the control circuit 205 can cause a change in the inclination angle 270 of the drone arms 220.

In one example, sensor data from the sensors 215 may indicate the drone is experiencing turbulence. In response to receiving such sensor data, the control circuit 205 may be configured to switch the drone arms 220 from having a substantially horizontal vertical angle (e.g., substantially zero degrees, 10 degrees, etc.) to a more inclined vertical angle or incline (e.g., 20 degrees, 30 degrees, 45 degrees, etc.) or vice versa. In other situations, the reverse may occur. That is, based on the sensor information from the sensors 215, the control circuit 205 may cause the drone arms to change from a first vertical angle (e.g., 45 degrees) to a second lesser vertical angle (e.g., 30 degrees, 20 degrees, 10 degrees, 0 degrees, etc.).

In other examples, the vertical angle 270 may be altered by the control circuit 205 in response to detection of the drone 200 being at a particular location or area or within a range of a particular area. Similarly, the vertical angle 270 may be altered by the control circuit 205 in response to detection of the drone 200 being vicinity or proximity (e.g., within a certain threshold of distance and/or height) of an object or structure, such as for example, another drone, a building, ground, wires, animal, etc.

The drone 200 may include or have access to GPS or other location data that indicates the drone's position. For example, the drone may switch to a mode that produces less vertical downwash in response to determining that the drone is over terrain in which too much dirt or dust may be produced (e.g., sanding or loose dirt terrain).

In one example, the drone 200 may operate or sense operation in a landing or taking-off mode. Depending on the circumstances, it may be advantageous for the control circuit to have the drone arms 210 at a certain inclination angle, e.g., wholly horizontal or inclined (e.g., 20 degrees, 30 degrees, 45 degrees, etc.) for such modes.

In further exemplary embodiments, the drone 200 may be designed or configured to fly in a light show. The control circuit 205 may be further configured to cause the drone 200 to fly in a light show, e.g., through interfacing with the rotors 210 and the flight guidance system. A drone light show in some circumstances may contain 1000 drones flying quite close to each other in a programmed, controlled, or coordinated manner. However, drones that are caught in a downwash begin flying in an uncontrolled manner leading to a degradation of the light shows. In order to mitigate or avoid the problems with downwash, the drones must be kept a certain distance away from each other, at least in a vertical sense. As a result, the image produced by the light show drones is thus less clear.

For example, a vertical display in the sky with 1200 drones, having a resolution of 40×30 pixels may generally require a vertical size between drones with 3 m spacing which would total 120 m.

However, using drones such as or similar to drone 200, the vertical distance spacing between drones can be decreased. As a result, there is an improvement in image quality and resolution because the pixel density can be increased. For example, drone 200 with drone arms 220 having a 20-degree drone arm inclination angle may be used in a light show. As a result, the drones may only need a vertical spacing distance of 2 m. Thus, in the case of 1200 drones arranged to have a resolution of 40×30 pixel, the total vertical spacing would only need to be 80 m. Further, the efficiency of the drone may only be reduced by 3%. Of course, other results may vary depending on the inclination angle, Reynolds number the size, and weight of the drone, and other factors.

Figure 7:
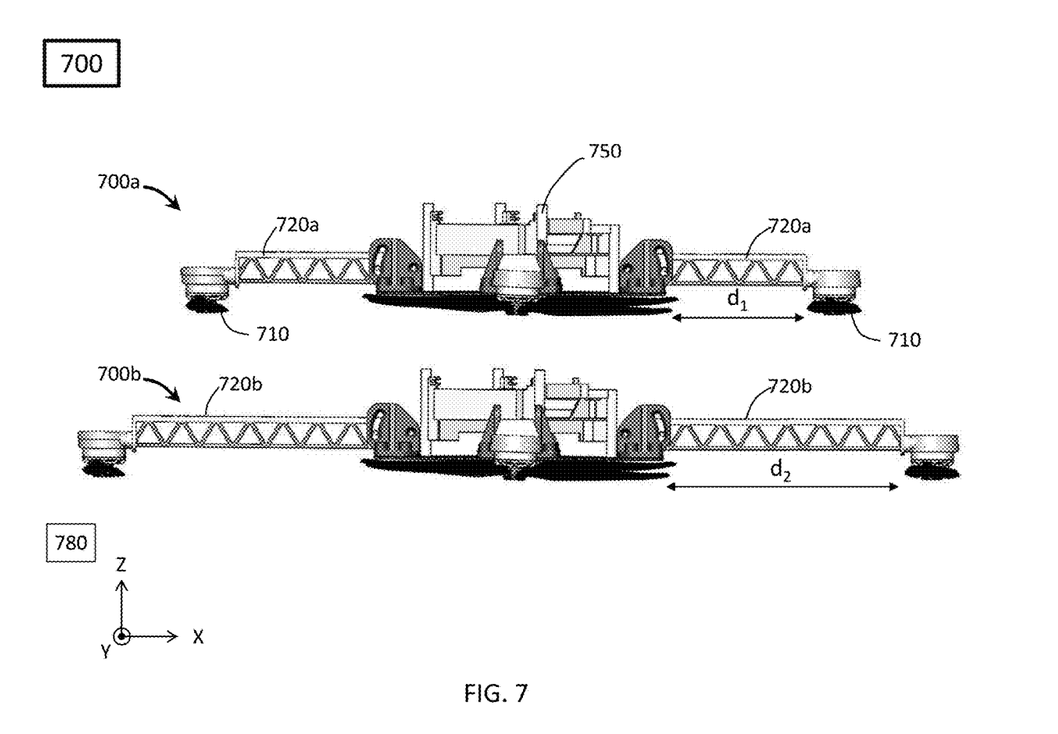
FIG. 7 shows an exemplary drone according to at least one exemplary embodiment of the present disclosure.

In accordance with exemplary embodiments of the present disclosure, FIG. 7 shows a drone 700. The drone 700 may be similar in design, function, and operation as the drone 100 of FIG. 1. However, unlike the drone 100, the lengths of the drone arms 720 are adjustable. Further, the drone 700 may be able to fly in at least two states or modes. For example, in a first state or mode, the drone 700 can fly with the drone arms 720a having a first or default length $d_1$. Then in a second state or mode, the drone 720 can fly with drone arms 710b being at a length $d_2$.

The drone 700 with drone arms 720a can operate and fly like a conventional drone, e.g., with the drone 700 producing a wholly or substantially vertical downwash (e.g., a substantially single stream vertical downwash.

The drone 700 with drone arms 720b can operate and fly so as to produce reduced vertical downwash, e.g., multi-stream vertical downwash. In such a case, individual downwashes produced by each of the rotors 710 do not overlap or do not completely or substantially overlap. In other words, distinct and spread-out individual downwashes may be produced.

The drone arms 720b have lengthened or elongated arms so that the rotors 710 are more spread out horizontally (e.g., spread out within the XY plane of coordinate system 780) and generate a less concentrated or less strong vertical downwash. Accordingly, the downwash produced by the drone 700 with drone arms 720b may not be a sum of downwashes produced by the rotors 710. Instead, the drone 700 with drone arms 720b produces a substantially multi-stream vertical downwash. In contrast to drone 200 of FIG. 2, the downwash produced by drone 700 with drone arms 720b may not have any substantial horizontal downwash.

In accordance with exemplary embodiments, the drone arms 720 may be manually adjustable. That is, a person may be able to adjust the length of the arms from a first default or retracted length $d_1$ to one or more extended lengths $d_2$. In accordance with exemplary embodiments of the present disclosure, the one or more extended lengths $d_2$ may be a continuum of lengths or may be one or more fixed lengths.

In at least one other exemplary embodiment of the present disclosure, the drone 700 may include means for adjusting the length of the drone arms. As described in connection with the drone 200, the drone 700 may also include the components shown in FIG. 3. In at least one example, the drone 700 may include motors, such as, for example, servomotors that are configured to control the extension and retraction of the drone arms 720, or in other words, configured to lengthen or extend and retract or shorten the drone arms 720.

In one or more exemplary embodiments of the present disclosure, the drone arms 720 may extend out from and retract into the drone body 750. In other embodiments, the drone 700 and drone arms 720 may use other include any suitable means for arm extension or shortening include, for example, drone arms 720 that are telescopic.

Referring again to FIG. 3, the drone 700, similar to drone 200, may include the same or similar components. However, for ease of understanding in the context of drone 700, the reference numbers are 7xx (e.g., control circuit 705). Thus, the drone 700 may include a control circuit 705 which is operably coupled (e.g., through wired or wireless means) to drone sensors 715, rotors 710, motor(s) 725, a transceiver(s) 735, and a guidance system 745.

In various embodiments, the control circuit 705 may be configured to control the extension or retraction of the drone arms 720 via motors 725 (e.g., servomotors) coupled to the drone arms 720. Further, the control circuit 705, based on obtaining or receiving certain feedback, may be configured to switch or change the length of the drone arms 720, e.g., from a first drone arms 720a to a second drone arms 720b or vice versa.

The control circuit 705 may interface with motor(s) (e.g., servomotor(s) which may include a microcontroller) and may be configured to operably cause motors to lengthen or contract the horizontal extension of the drone arms 720 so as to have a particular length $d_x$. The control circuit 705 may cause the drone arms to have a certain length in response to receiving control signal(s). The drone 700 may switch from being one state (e.g., a state associated with the drone configured to produce a certain amount of or percentage of vertical downwash) to being in another state (e.g., a state associated with the drone producing a different amount of vertical downwash).

In various embodiments, switching may be done from a state/mode in which the drone produces substantially concentrated vertical single-stream to a state/mode in which the drone produces reduced or spread multi-stream vertical downwash.

In various embodiments, the drone 700 includes a control circuit 705 that obtains control signal(s) received by the transceiver 735. The control signals may indicate that that the downwash and/or the length of the drone arms 720 should be changed or altered. As such, in response to obtaining or receiving the control signal, the control circuit 705 may cause the drone arms 720 (e.g., via the motors 725) to extend/lengthen or shorten/retract.

Further, control signal(s) may indicate a particular or specific length for the drone arms 720. Then the control circuit 705 in response to obtaining the control signal, e.g., through the transceiver 735 causes the arms 720 to extend or shorten via the motors 725 to a certain length.

In accordance with at least one embodiment of the present disclosure, the drone 700 includes a transceiver 235 that receives one or more control signals from a remote device 300. The remote device 300 may be any suitable computing device (remote control, computer, smartphone, tablet, etc.) that can wireless transmit signals to the drone transceiver 235.

In one or more exemplary embodiments of the present disclosure, the control circuit 205 also causes the drone arms 720 of drone 700 to change position in response to detection of certain environmental or flight circumstances. That is, the drone 700, like drone 200 may include sensors 215 (See FIG. 3). Based on sensor data obtained from the sensors 215, the control circuit 205 can cause a change in the length of the drone arms 720.

In one or more examples, sensor data from the sensors 215 may indicate the drone is experiencing turbulence. In response to receiving such sensor data, the control circuit 205 may be configured to switch the drone arms 220 from having a one first length (e.g., a default or retracted length) to a longer length, or vice versa.

In general, based on certain sensor information from the sensors 215, the control circuit 205 may cause the drone arms to change from a first length that is causing a particular type of downwash (e.g., a concentrated or substantially single stream downwash) to a second longer length causing a different type of downwash (diffused, spread or multi-stream downwashes), or vice versa.

In another example, the horizontal length of the drone arms 720 may be altered by control circuit 205 in response to detection of the drone 700 being at a particular area/location or within vicinity or proximity (e.g., within a certain threshold of distance) of an object or structure, such as for example, another drone, a building, ground, wires, animal, etc. Further, the length 270 may be altered by control circuit 205 in response to determining that the drone is located at a specific position. For example, the drone may include or have access to GPS or other location data that indicates the drone's position.

In one example, the drone 700 may be programmed to take-off or land, or detect the operation thereof. Depending on the circumstances, it may be advantageous for the control circuit 705 to cause the drone arms 720 to have a certain length while taking off or landing or cause the drone 700 to cause a particular type of downwash (e.g., concentrated vertical single-stream or spread or multi-stream vertical downwash).

The control circuit 705 may be further configured to cause the drone 700 to fly, e.g., through interfacing with the rotors 710, using the flight guidance system. As with the drone 200, the drone 700 may be designed or configured to fly in a light show. As before, the drone 700 may be programmed to operate in the extended mode 700b so that the vertical distance spacing between drones can be decreased. The drone 700 may be configured, e.g., through the control circuit 705, to fly in the extended mode 700b for at least one portion of the light show. Again, the flying in the second mode 700b creates a less or unconcentrated or diffused vertical downwash to allow for closer spacing of drones and thus again resulting in an improvement to image quality and increased pixel density.

Figure 4:
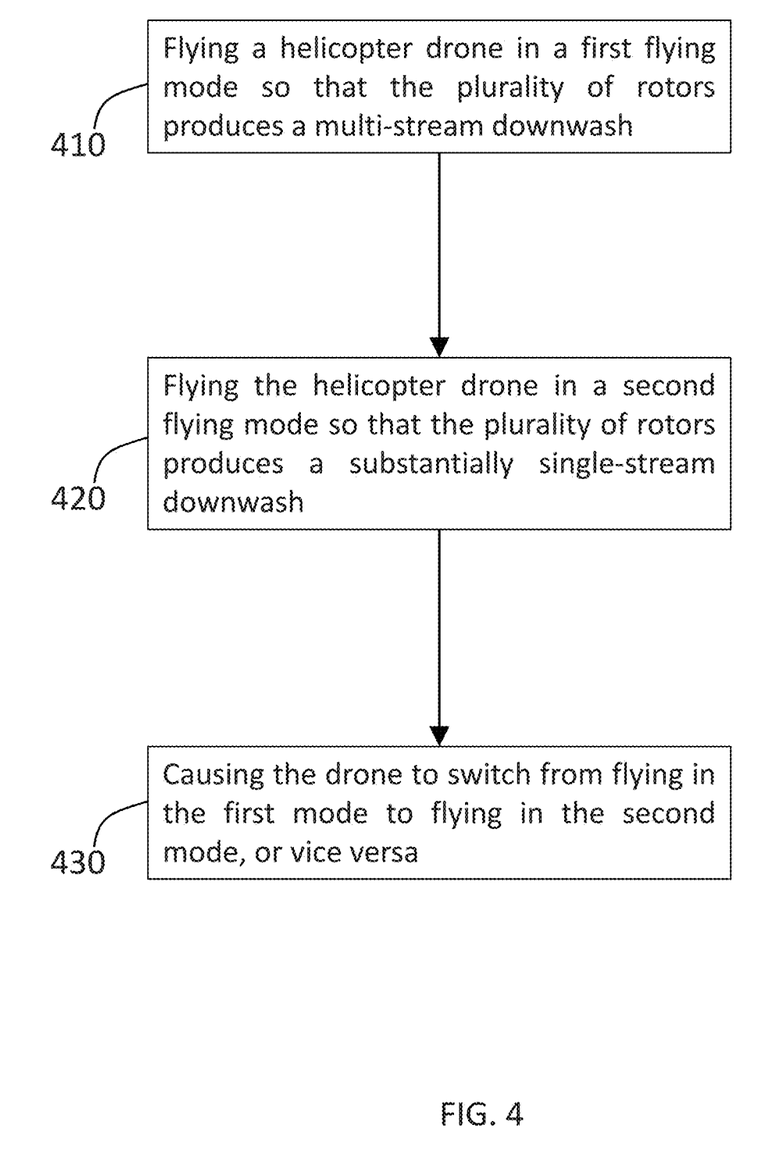
FIG. 4 shows an exemplary method for operating a drone according to at one exemplary embodiment of the present disclosure.

In accordance with exemplary embodiments of the present disclosure, FIG. 4 depicts a method 400 for flying a drone. The method be used with or applied to the various exemplary drones described herein.

At 410, the method includes flying a helicopter drone in a first mode, so that the plurality of rotors of the drone produce a multi-stream downwash. The drone may be any drone, including the exemplary drones described herein, that can produce multi-stream downwash and single or substantially single downwash. In one example, the drone producing the multi-stream downwash may drone such as the drones described in connection with FIG. 2 or 7 of the present disclosure.

At 420, the method includes flying the helicopter drone in a second mode so that the plurality of rotors produces at least a single or substantially single-stream downwash. At 430, the method further includes causing the drone to switch from flying in the first mode to flying in the second mode or vice versa. For example, if the drone is flying in the second mode, the drone is operably caused the drone to switch to fly in the first mode. Similarly, if the drone is flying in the first mode, then the drone is operably caused to switch to fly in the second mode. That is, the drone may be selectively caused to switch between the first mode and second mode.

In at least one example in connection with method 400, a drone may include a drone body and a plurality of arms each including at least one rotor with the drone arms extending from the drone body so that each arm of the plurality of arms forms an inclination angle with respect to the virtual horizontal plane aligned to a horizontal spread of the drone body. Thus according to exemplary implementation method 400, flying the drone in the first mode may include flying the drone with each arm of the plurality of arms forming an elevation angle of greater than 10 degrees with a virtual horizontal plane, e.g., producing a multi-stream downwash. Further in such an example, flying in the second mode may include flying with each arm of the plurality of arms forming an elevation angle of less than or equal to 10 degrees to the virtual horizontal plane e.g., producing a single or substantially single-stream downwash. Further, the drone may be caused to switch the flying modes. For example, means described herein (see drones described in connection with at least FIG. 2) can cause or effectuate the drone arms forming an elevation angle of greater than 10 degrees with a virtual horizontal plane and forming an elevation angle of less than or equal to 10 degrees with a virtual horizontal plane.

In at least one other example, the method 400 may be applied to drones such as described in connection with FIG. 7. That is, such a drone helicopter may include a drone body and a plurality of arms extending from the drone body. Flying the drone helicopter in the first mode may include flying the drone with each of the plurality of arms in an extended of elongated position to produce a multi-stream downwash. Flying such a drone in the second mode may include flying the drone with each of the plurality of arms in a retracted or shortened position so to produce a single or substantially single stream downwash.

Regarding 430 of FIG. 4, various exemplary embodiments herein described various mechanisms that can cause, trigger, or initiate the switching flying modes of the drones. For example, as described herein, the drone may receive (e.g., wirelessly) command(s) to switch flying modes and in response, the drone switches or toggles between flying modes. Also as described in exemplary embodiments herein, the drone itself may switch from one flying mode to another flying in response to detecting certain conditions (e.g., turbulence), in response detecting a position or areas, in response to being in or about to be in a certain flight stage or state (e.g., takeoff, landing), and/or due to being programmed to switch periodically or at certain times (e.g., in a drone light show).

The following examples pertain to further aspects of this disclosure:

Example 1 is a drone helicopter including a plurality of rotors, wherein the plurality of rotors is configured to produce a multi-stream downwash.

In Example 2, the subject matter of Example 1, wherein the drone helicopter may further include a drone body; a plurality of arms extending from the drone body, wherein each arm of the plurality of arms forms an elevation angle with respect to a virtual horizontal plane, the virtual horizontal plane being aligned and parallel to a horizontal extension of the drone body, wherein each rotor of the plurality of rotors is coupled to one arm of the plurality of rotors.

In Example 3, the subject matter of Example 2, wherein the elevation angle may be greater than or equal to 10 degrees.

In Example 4, the subject matter of Example 2 or 3, wherein the elevation angle is between 10 and 45 degrees.

In Example 5, the subject matter of Examples 2 to 4, wherein the drone helicopter may include a first state, wherein the plurality of rotors is configured to produce the multi-stream downwash in the first state; and a second state, wherein the plurality of rotors is configured to produce a substantially single-stream downwash in the second state.

In Example 6, the subject matter of Example 5, wherein in the first state, each of the plurality of arms may form a first elevation angle that is greater than or equal to 10 degrees with the virtual horizontal plane, and wherein in the second state each of the plurality of arms may form a second elevation angle less than 10 degrees with the virtual horizontal plane.

In Example 7, the subject matter of Example 5 or 6, wherein in the first state, each of the plurality of arms may be configured to be in an extended or elongated stated, and wherein the second state, each of the plurality of arms may be configured to be in a retracted or shortened state.

In Example 8, the subject matter of any of Examples 5 to 7, wherein the drone helicopter may be further configured to switch back and forth between the first state and the second state.

In Example 9, the subject matter of any of Examples 5 to 8, wherein the drone helicopter may further include: one or more motors; and a control circuit comprising at least one processor, wherein the control circuit is configured to actuate the one or more motors so as to cause the plurality of arms to switch from the first state to the second state or vice versa.

In Example 10, the subject matter of Example 9, wherein the control circuit may be configured to actuate the one or more motors so as to cause the plurality of arms to switch from the first state to the second state or vice versa by causing each of the plurality arms to at least partially rotate or incline.

In Example 11, the subject matter of Example 9 or 10, wherein the control circuit may be configured to actuate the one or more motors so as to cause the plurality of arms to switch from the first state to the second state or vice versa at one or more predefined times.

In Example 12, the subject matter of any of Examples 9 to 11, wherein the drone helicopter may further include: a wireless transceiver circuit configured to receive one or more signals; and wherein the control circuit is configured to actuate the one or more motors so as to cause the plurality of arms to switch from the first state to the second state or vice versa in response to obtaining at least one control signal received by the wireless transceiver circuit.

In Example 13, the subject matter of any of Examples 9 to 12, wherein the drone helicopter may further include: one or more sensors configured to obtain sensor data; wherein the control circuit is configured to actuate the one or more motors so as to cause the plurality of arms to switch from the first state to the second state or vice versa based on the sensor data obtained from the one or more sensors.

In Example 14, the subject matter of Example 13, wherein the obtained sensor data may indicate or detect turbulence to the drone helicopter.

In Example 15, the subject matter of any of Examples 1 to 14, wherein the drone helicopter may be one of a dual-rotor helicopter, a tri-copter, a quadcopter, a pentacopter, a hexacopter, or an octocopter.

Example 16 is a method for operating a drone including a plurality of rotors, the method including flying the drone in a first mode, wherein in the first mode the plurality of rotors produces a multi-stream downwash.

In Example 17, the subject matter of Example 16, wherein the method may further include flying the drone in a second mode, wherein in the second mode the plurality of rotors produces a substantially single-stream downwash.

In Example 18, the subject matter of Example 17, wherein the method may further include causing the drone to switch from flying in the first mode to flying in the second mode, or vice versa.

In Example 19, the subject matter of any of Examples 16 to 18, wherein the drone helicopter may include a drone body and a plurality of arms extending from the drone body so that each arm of the plurality of arms forms an inclination angle with respect to a virtual horizontal plane aligned to a horizontal spread of the drone body, and wherein flying the drone in the first mode may include flying the drone with each arm of the plurality of arms forming an elevation angle of greater than 10 degrees with a virtual horizontal plane, the virtual horizontal plane being parallel to a horizontal extension (spread) of the drone body.

In Example 20, the subject matter of any of Examples 16 to 19, wherein the drone helicopter may include a drone body and a plurality of arms extending from the drone body so that each arm of the plurality of arms forms an inclination angle with respect to a virtual horizontal plane aligned to a horizontal spread of the drone body, and wherein flying in the second mode may include flying with each arm of the plurality of arms forming an elevation angle of less than or equal to 10 degrees to the virtual horizontal plane.

In Example 21, the subject matter of any of Examples 16 to 20, wherein the drone helicopter includes a drone body and a plurality of arms extending from the drone body, wherein flying in the first mode may include flying the drone with each of the plurality of arms in an extended position.

In Example 22, the subject matter of any of Examples 16 to 21, wherein the drone helicopter includes a drone body and a plurality of arms extending from the drone body, wherein flying in the second mode may include flying the drone with each of the plurality of arms in a retracted or shortened position.

Example 23 is a non-transitory computer-readable storage medium storing program instructions for operating a drone including a plurality of rotors, the program instructions causing a computer to perform a method including flying the drone in a second mode, wherein the second mode the plurality of rotors to produce a substantially single-stream downwash; flying the drone in a second mode, wherein the second mode the plurality of rotors to produce a substantially single-stream downwash; and causing the drone to switch from flying in the first mode to flying in the second mode, or vice versa.

In Example 24, the subject matter of Example 23, wherein flying the drone in the first mode may include flying the drone so that each arm of a plurality of arms of the drone forms an elevation angle of greater than 10 degrees with a virtual horizontal plane, the virtual horizontal plane being parallel to a horizontal extension (spread) of the drone body.

In Example 25, the subject matter of Example 23 or 24, wherein flying in the second mode may include flying with each arm of a plurality of arms forms an elevation angle of less than or equal to 10 degrees to the virtual horizontal plane.

In Example 26, the subject matter of any of Examples 23 to 25, wherein flying in the first mode may include flying the drone with each of a plurality of arms of the drone being in an extended position.

In Example 27, the subject matter of any of Examples 23 to 26, wherein flying in the second mode may include flying the drone with each of a plurality of arms of the drone being in a shortened or retracted position.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims, and all changes which come within the meaning and range of equivalency of the claims are therefore intended to be embraced.

What is claimed is:

1. A drone helicopter comprising:
   a plurality of rotors, wherein the plurality of rotors is configured to produce a multi-stream downwash;
   a drone body;
   a plurality of arms extending from the drone body, wherein each arm of the plurality of arms forms an elevation angle with respect to a virtual horizontal plane, the virtual horizontal plane being aligned and parallel to a horizontal extension of the drone body, wherein each rotor of the plurality of rotors is coupled to one arm of the plurality of arms;
   a first state, wherein the plurality of rotors is configured to produce the multi-stream downwash in the first state;
   a second state, wherein the plurality of rotors is configured to produce a substantially single-stream downwash in the second state;
   one or more motors; and
   a control circuit comprising at least one processor, wherein the control circuit is configured to actuate the one or more motors so as to cause the plurality of arms to switch from the first state to the second state or vice versa;
   one or more sensors configured to obtain sensor data, wherein the control circuit is configured to actuate the one or more motors so as to cause the plurality of arms to switch from the first state to the second state or vice versa based on the sensor data obtained from the one or more sensors, and wherein the obtained sensor data indicates the drone helicopter is detecting turbulence to the drone helicopter.

2. The drone helicopter of claim 1, wherein the elevation angle is greater than or equal to 10 degrees.

3. The drone helicopter of claim 2, wherein the elevation angle is between 10 and 45 degrees.

4. The drone helicopter of claim 1,
   wherein in the first state, each of the plurality of arms forms a first elevation angle that is greater than or equal to 10 degrees with the virtual horizontal plane, and
   wherein in the second state each of the plurality of arms forms a second elevation angle less than 10 degrees with the virtual horizontal plane.

5. The drone helicopter of claim 1,
   wherein in the first state, each of the plurality of arms is configured to be in an extended or elongated stated, and
   wherein the second state, each of the plurality of arms is configured to be in a retracted or shortened state.

6. The drone helicopter of claim 1,
   the drone helicopter is configured to switch back and forth between the first state and the second state.

7. The drone helicopter of claim 1,
   wherein the control circuit is configured to actuate the one or more motors so as to cause the plurality of arms to switch from the first state to the second state or vice versa by causing each of the plurality arms to at least partially rotate or incline.

8. The drone helicopter of claim 1,
   wherein the control circuit is configured to actuate the one or more motors so as to cause the plurality of arms to switch from the first state to the second state or vice versa at one or more predefined times.

9. The drone helicopter of claim 1, further comprising:
a wireless transceiver circuit configured to receive one or more signals;
wherein the control circuit is configured to actuate the one or more motors so as to cause the plurality of arms to switch from the first state to the second state or vice versa in response to obtaining at least one control signal received by the wireless transceiver circuit.

10. The drone helicopter of claim 1,
wherein the drone helicopter is one of a dual-rotor helicopter, a tri-copter, a quadcopter, a pentacopter, a hexacopter, or an octocopter.

11. A method for operating a drone helicopter including a plurality of rotors, and one or more motors, the method comprising;
flying the drone in a first mode, wherein in the first mode the plurality of rotors produces a multi-stream downwash;
flying the drone in a second mode, wherein in the second mode the plurality of rotors produces a substantially single-stream downwash;
causing the drone to switch from flying in the first mode to flying in the second mode, or vice versa comprising:
obtaining sensor data indicating the drone helicopter is detecting turbulence;
actuating, by a control circuit of the drone helicopter, the one or more motors so as to cause a plurality of arms to switch from the first mode to the second mode or vice versa based on the obtained sensor data.

12. The method of claim of claim 11,
wherein the drone helicopter comprises a drone body and a plurality of arms extending from the drone body so that each arm of the plurality of arms forms an inclination angle with respect to a virtual horizontal plane aligned to a horizontal spread of the drone body,
wherein flying the drone in the first mode comprises flying the drone with each arm of the plurality of arms forming an elevation angle of greater than 10 degrees with a virtual horizontal plane, the virtual horizontal plane being parallel to a horizontal extension of the drone body, and
wherein flying in the second mode comprises flying with each arm of the plurality of arms forming an elevation angle of less than or equal to 10 degrees to the virtual horizontal plane.

13. The method of claim of claim 11,
wherein the drone helicopter comprises a drone body and a plurality of arms extending from the drone body,
wherein flying in the first mode comprises flying the drone with each of the plurality of arms in an extended position, and
wherein flying in the second mode comprises flying the drone with each of the plurality of arms in a retracted or shortened position.

14. A non-transitory computer-readable storage medium storing program instructions for operating a drone helicopter including a plurality of rotors and one or more motors, the program instructions causing a computer to:
fly the drone in a first mode, wherein the first mode the plurality of rotors to produce a multi-stream downwash;
fly the drone in a second mode, wherein the second mode the plurality of rotors to produce a substantially single-stream downwash; and
cause the drone to switch from flying in the first mode to flying in the second mode, or vice versa, comprising to:
obtain sensor data indicating the drone helicopter is detecting turbulence; and
actuate, by a control circuit of the drone helicopter, the one or more motors so as to cause a plurality of arms to switch from the first mode to the second mode or vice versa based on the obtained sensor data.

* * * * *